July 26, 1932. D. G. ROWELL 1,868,809
CAR MOVER
Filed July 29, 1929 2 Sheets-Sheet 2

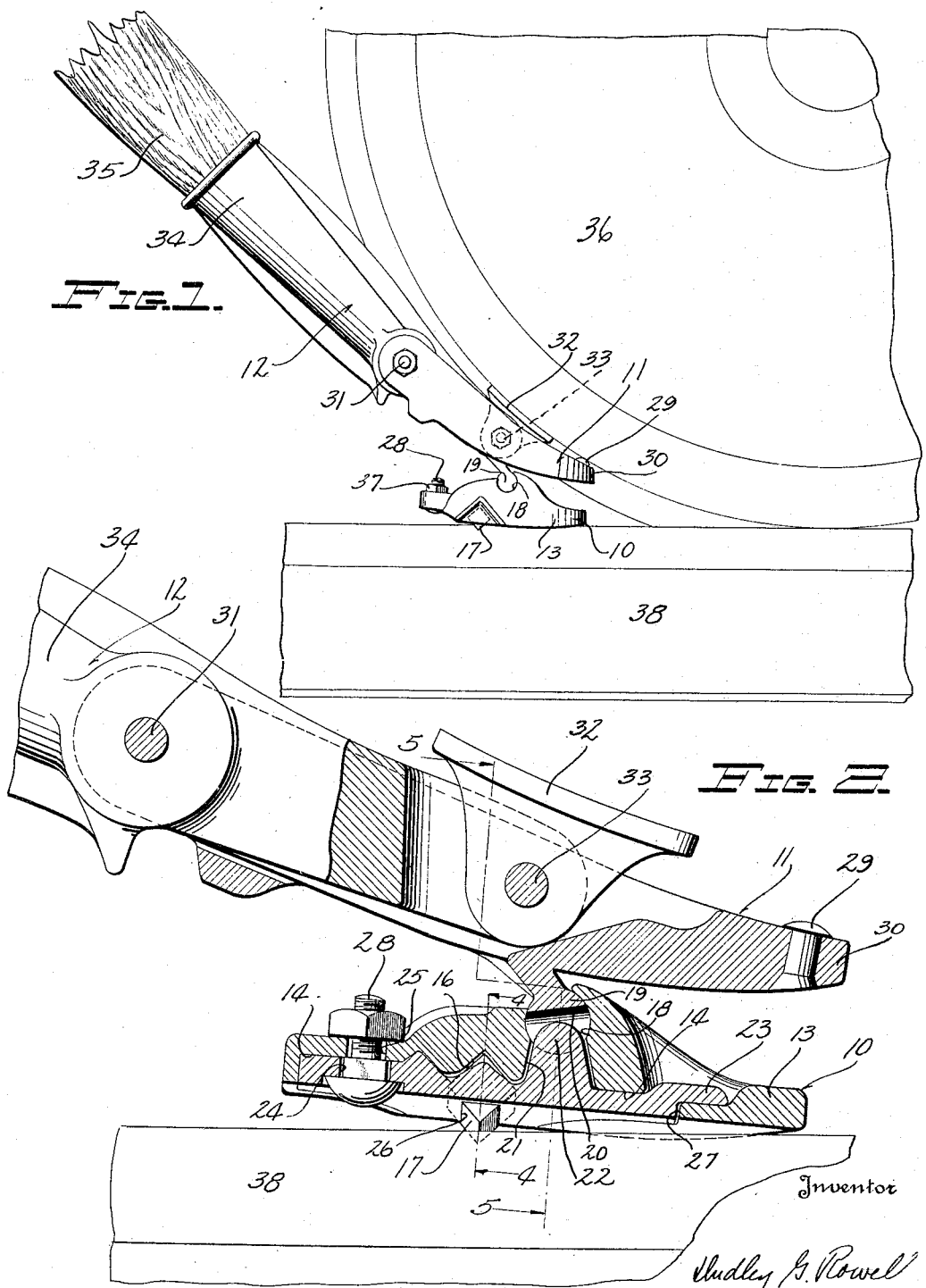

Inventor
Dudley G. Rowell
By Wheeler, Wheeler & Wheeler
Attorneys

Patented July 26, 1932

1,868,809

UNITED STATES PATENT OFFICE

DUDLEY G. ROWELL, OF APPLETON, WISCONSIN

CAR MOVER

Application filed July 29, 1929. Serial No. 381,773.

My invention relates to an improvement in car movers.

The object of my invention is to provide a car mover which will apply its motive force at the proper point in the periphery of a car wheel whereby to expend the motivating force in a most efficient manner.

Another object of my invention is to provide a car mover wherein the assembly of the various parts thereof is made extremely simple by reason of the interlocking of the various parts.

A further object of my invention is to provide an arrangement of parts of a car mover whereby the portions contacting with a car wheel are so pivotally mounted that as to each of said parts contacting with a car wheel, there is a definite range of movement so governed by their pivotal mountings that substantially no friction loss is incurred between such parts and the car wheel.

In the drawings;

Figure 1 is a side elevation of my car mover in position against the periphery of a portion of a car wheel and resting upon a railroad rail.

Figure 2 is a side elevation of my car mover with portions thereof in vertical section showing the assembly of the interlocking parts.

Like parts are identified by the same reference characters throughout the several views.

Figure 3:
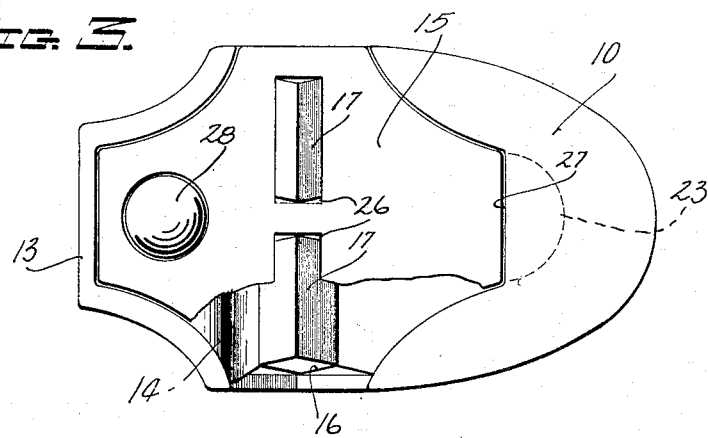
Figure 3 is a view of the bottom of the rail shoe of my car mover.

The various portions of my car mover may be divided under three main headings, namely the rail shoe 10, the prying lever 11 and the thrust lever 12.

The rail shoe comprises an assembly of parts which, taken as a whole, form the support for the rest of the structure comprising my entire car mover. These parts are assembled with reference to a frame 13 provided with a recessed bottom as shown at 14 for the reception of a locking plate 15 which is shown most clearly in cross section in Fig. 2 and performs a number of offices as hereinafter described.

Figure 4:
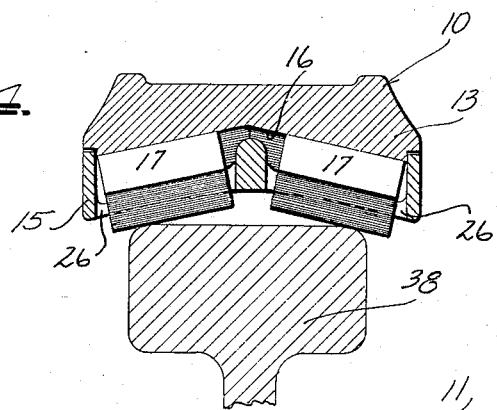
Figure 4 is a section on line 4—4 of Fig. 2.
Figure 5:
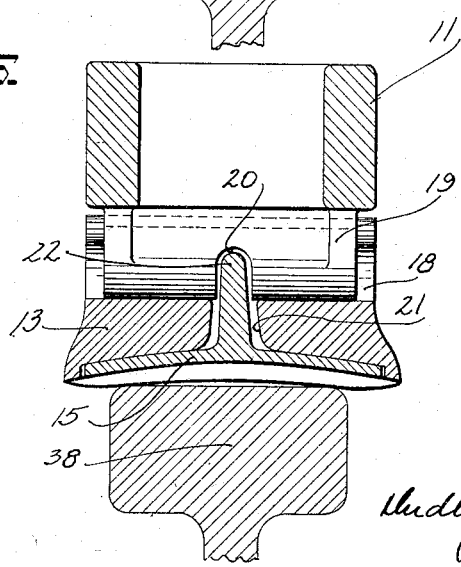
Figure 5 is a section on line 5—5 of Fig. 2.

At 16 an inverted V-shaped channel in the frame 13 has its central portion elevated as indicated in the cross section in Fig. 4 for the reception of a pair of rail spurs 17 and at 18 a transversely extending trunnion socket is provided for the reception of a trunnion 19 forming the supporting bearing member for the prying lever 11. The trunnion 19 is notched at 20 and this registers with an aperture 21 opening from the recess of the frame 13 of the rail shoe into the transverse trunnion socket 18. A boss 22 extending upwardly from the locking plate 15 is adapted to extend upwardly through the aperture 21 into the notch 20 to engage the trunnion bearing 19 and prevent its lateral displacement in the trunnion socket 18 when the locking plate 15 is in assembled relation to the rail shoe 10.

The locking plate 15 is provided forwardly with a tongue 23 and rearwardly with an aperture 24 registering with an aperture 25 in the rearward portion of the frame 13 of the rail shoe and this locking plate 15 is likewise provided with spaced transverse apertures 26, so that when the locking plate 15 is in position as shown in Fig. 2 with the tongue 23 inserted through an aperture 27 and a bolt 28 is inserted through the apertures 24 and 25 an interlocking of the various parts preventing removal of the trunnion bearing 19 from the trunnion socket 18 and preventing the removal or turning of the rail spurs 17 is accomplished.

The prying lever 11, mounted as it is upon and integral with the trunnion bearing 19, comprises a lever of the first class, the load being received upon the outstretched end 30 and the power being applied upon a pivot pin 31. The thrust lever 12 is pivotally mounted upon the pin 31 and in acting on the wheel directly functions as a lever of the first class receiving its load upon a thrusting pad 32 pivotally mounted upon a pivot pin 33 at the end of the thrusting lever 12 which is socketed at its other extremity to receive a handle 35 as indicated in Fig. 1. Insofar as the reaction of fulcrum 31 actuates prying lever 11, the thrust lever may also be regarded as a lever of the second class pivoting upon the pad 32 and delivering power through fulcrum pin 31, Preferably a hardened pin 29 is provided in the end of the prying lever to receive the brunt of the contact of that lever with the periphery of a car wheel 36 as shown in Fig. 1.

In the assembly of my car mover it is only necessary to secure the bolt 28 in position shown in Fig. 2 by turning down the nut 37 after the bolt has been inserted through the apertures 24 and 25, for the trunnion bearing 19 in the trunnion socket 18 and the spurs 17 in their groove 16 are automatically locked by the locking plate 15 when it is held in place by this one bolt.

When my car mover is completely assembled and is thrust into the position shown in Fig. 1 upon a rail 38 beneath a car wheel 36 it will be noted that the rail shoe is positioned as a solid foundation unit which will maintain its position upon its spurs 17 until its work at that particular location is completed and there need be not rocking motion of the spurs upon the rail or of the shoe upon the rail during the actual thrusting operation which comprises the work to be performed by my device.

All of the motivating power imparted to the handle 35 mounted upon the pivot pin 31 is therefore solidly and firmly imparted to the periphery of the car wheel 36. It will be noted that the hardened pin 29 is adapted to maintain its position in one spot against the periphery of the car wheel as the wheel moves forwardly, since the arc of movement of the hardened pin with reference to the trunnion bearing 19 is coincident with the arc of movement of the spot on the wheel against which the hardened pin bears. Likewise the thrusting pad 32 is so mounted with reference to the rail shoe that as the wheel 36 moves forwardly the thrusting pad will maintain its position against the periphery of the wheel 36 at one point and will follow that point in the periphery of the wheel because of the arrangement of the parts as above described.

It will also be noted that none of the forces applied to the periphery of the car wheel 36 are essentially lifting forces but that they are forces adapted to roll the wheel, and the the tendency of my car mover in this respect results in an efficient expenditure of power in accomplishing the work that my device is intended to perform.

It will likewise be noted that there are three bearing members included in my device each of which is intended to place the two contact points comprising the parts 32 and 29 at the proper positions against the car wheel and maintain them in this position throughout the movement of the handle 35.

This result is effected by proportioning the parts to the diameter of a standard car wheel as illustrated.

I claim:

1. In a device of the character described, the combination with a supporting frame provided with a trunnion groove and apertured intermediate the ends of said groove, of a notched trunnion bearing receivable in the groove and a locking plate provided with a boss projecting upwardly through the trunnion groove aperture into the notch in the trunnion bearing whereby to prevent displacement of the bearing in the groove.

2. In a device of the character described, the combination with an apertured supporting frame provided with a trunnion groove and apertured intermediate the ends of said groove, of a notched trunnion bearing receivable in the groove and a lipped locking plate provided with a boss projecting upwardly through the trunnion groove aperture into the notch in the trunnion bearing whereby to prevent displacement of the bearing in the groove.

3. In a device of the character described, a rail shoe including an apertured frame, provided with a spur groove, a locking plate provided with a lip receivable through the aperture in the frame and the locking plate being provided with apertures registering with the spur grooves in the frame.

4. In a device of the character described, the combination with a rail shoe provided with a trunnion groove, of a prying lever provided with a trunnion bearing receivable in the trunnion groove, and a locking plate provided with a boss for securing the trunnion bearing in the trunnion groove, said locking plate being detachably secured to the rail shoe.

5. In a device of the character described, the combination with a rail shoe including an apertured frame, of a locking plate provided with a lip for insertion in an aperture of the rail shoe frame, a locking boss integral with the locking plate for insertion through another aperture in the rail shoe frame, and means spaced from said lip for manual interlocking of the locking plate with the rail shoe frame.

6. In a device of the character described, the combination with a rail shoe frame provided with a trunnion groove and apertured intermediate the ends of said groove and provided with an aperture spaced from said trunnion groove, of a locking plate provided with a lip receivable in the last mentioned aperture and provided with a boss for insertion in the aperture intermediate the ends of the trunnion groove.

DUDLEY G. ROWELL.